United States Patent [19]

Ploix

[11] Patent Number: 4,794,630
[45] Date of Patent: Dec. 27, 1988

[54] PICTURE-TUBE VIDEO-CAMERA RADIOLOGY INSTALLATION

[75] Inventor: Jean L. Ploix, Issy les Moulineaux, France

[73] Assignee: Thomson-CGR, Paris, France

[21] Appl. No.: 929,274

[22] Filed: Nov. 12, 1986

[30] Foreign Application Priority Data

Nov. 15, 1985 [FR] France .................... 85 16938

[51] Int. Cl.⁴ .................... G01N 23/04; H04N 5/32
[52] U.S. Cl. .................... 378/99; 358/111
[58] Field of Search ................ 378/99; 358/111, 223

[56] References Cited

U.S. PATENT DOCUMENTS

| | | |
|---|---|---|
| 4,137,454 | 1/1979 | Brandon, Jr. . |
| 4,193,089 | 3/1980 | Brougham et al. . |
| 4,233,633 | 11/1980 | Nemner .................... 358/111 |
| 4,359,759 | 11/1982 | McBride et al. .................... 358/111 |
| 4,638,355 | 1/1987 | Melman . |

FOREIGN PATENT DOCUMENTS 2337977 5/1977 France .
0096940 12/1983 France .

OTHER PUBLICATIONS

Patent Abstracts of Japan, vol. 9, no. 53 (E-301) (1776), Mar. 7, 1985.
Patent Abstracts of Japan, vol. 9, no. 43 (E-298) (1776), Feb. 22, 1985.
Patent Abstracts of Japan, vol. 6, no. 107 (E-113) (1985), Jun. 17, 1982.

Primary Examiner—Carolyn E. Fields
Assistant Examiner—Joseph A. Hynds
Attorney, Agent, or Firm—Oblon, Fisher, Spivak, McClelland & Maier

[57] ABSTRACT

In a radiology installation equipped with a picture-tube video camera for producing images in rapid succession, the electron beam of the camera tube has a first intensity at the time of readout of one image on the sensitive tube surface and a second non-zero intensity of substantially lower value than the first between readout of one image and write-in of the next. A control circuit for modifying the grid voltage of the camera tube is accordingly provided for varying the intensity of the electron beam.

11 Claims, 2 Drawing Sheets

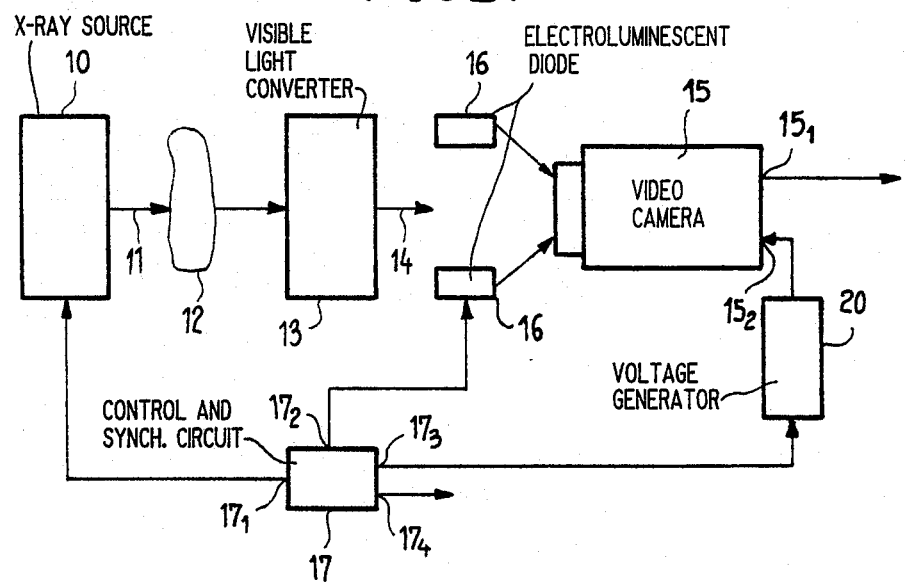
FIG_1
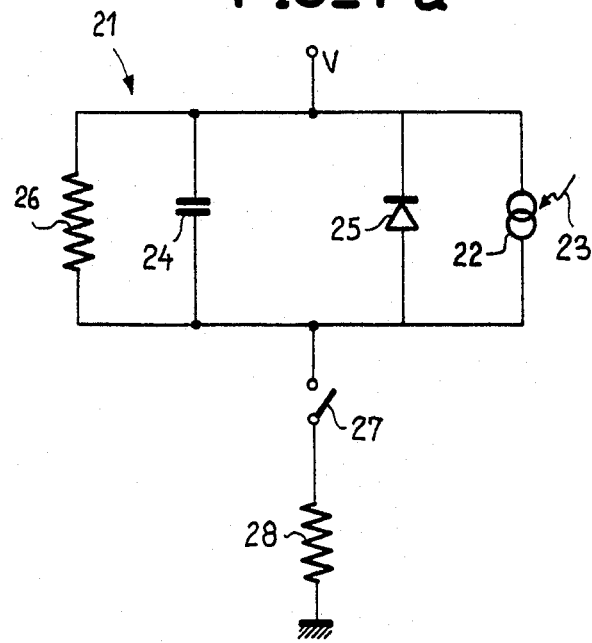
FIG_1-a

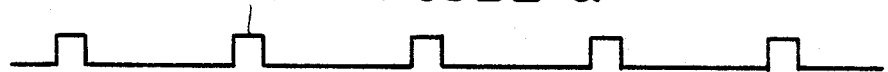
FIG_2-a
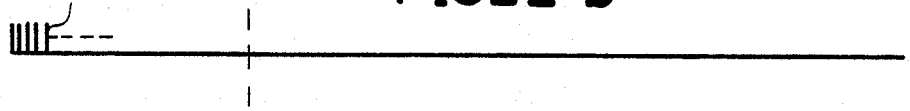
FIG_2-b
FIG_2-c
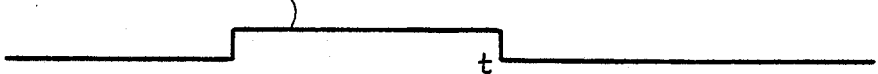
FIG_2-d
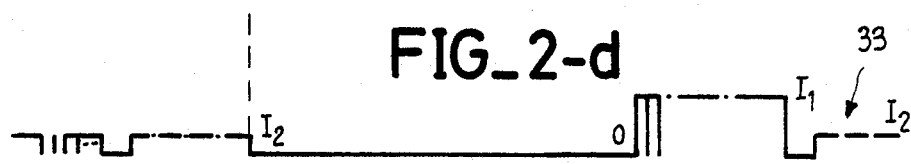
FIG_2-e
FIG_2-f
FIG_2-g
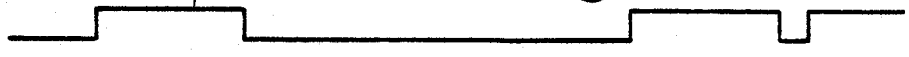
FIG_2-h

PICTURE-TUBE VIDEO-CAMERA RADIOLOGY INSTALLATION

BACKGROUND OF THE INVENTION

1. Field of the Invention

This invention relates to a picture-tube video-camera radiology installation.

2. Description of the Prior Art

The sensitive surface (or target) of the pickup tube of a video camera is generally regarded as being formed of capacitive elements charged by the incident light energy and discharged by a readout electron beam in which the discharge current constitutes the camera output signal.

In a camera radiology installation of this type, images are often formed in rapid succession. In addition, the successive images are usually combined. For the visual display of a human body organ, for example, the procedure consists in subtracting the signals corresponding to two successive images, one of which corresponds to illumination of a patient with X-rays under the usual conditions whilst the other image corresponds to illumination of the same patient with a contrast-enhancing agent.

It has been found that rapidly succeeding images exhibit a reduction in quality and that, in addition, the combination of two successive images is not of high quality.

SUMMARY OF THE INVENTION

The invention makes it possible to overcome these drawbacks by reducing but not cancelling the intensity of the electron beam of the picture tube between readout of one image add formation of the next image on the sensitive surface. Without readout, the beam intensity is, for example, about ten times lower than at the time of readout.

With this arrangement, the capacitive element formed by each element of the sensitive surface is discharged more effectively after readout of an image. Accordingly, when this sensitive surface subsequently receives the second image, each element will have a stored charge which is practically independent of the charge which it had stored during reception of the previous image. This improvement in the discharge of each capacitive element results from the fact that the electron beam acts as a discharge impedance and that this impedance varies in the same direction as the intensity of the beam on condition, however, that this intensity remains higher than that of the signal to be read.

When two images follow each other in rapid succession, the quality of reconstruction of the second image is substantially enhanced and a combination such as subtraction, for example, is also of better quality than in the prior art in which the electron beam intensity remained unchanged.

Preferably, the electron beam has a first intensity at the time of readout of each image and a second intensity of lower value than the first outside these readout periods even in the standby state. In this case, apart from the advantage mentioned earlier, the service life of the picture tube is increased.

In order to achieve a further improvement in readout of successive images, it is also preferable to make use of means for illuminating the target (sensitive surface) of the picture tube outside the periods of image reception in order to ensure that each capacitive element contains a minimum charge below which the charge would be non-linear. The light energy for imparting the minimum charge is applied as soon as the camera is turned-on without awaiting utilization. Preferably, the light energy is supplied in the form of pulses, advantageously at the frame scanning frequency or at the line scanning frequency. In one form of construction, the light pulse is delivered during the frame blanking interval.

BRIEF DESCRIPTION OF THE DRAWINGS

FIG. 1 is a diagram of an apparatus in accordance with the invention.

FIG. $1_a$ is a circuit diagram equivalent to a sensitive surface element and to the electron beam of a video camera scanner tube.

FIGS. $2_a$ to $2_h$ are diagrams illustrating the operation of the apparatus in accordance with the invention in a number of embodiments.

DESCRIPTION OF THE PREFERRED EMBODIMENTS

The radiology installation shown in FIG. 1 includes an X-ray generator 10 for producing radiation 11 which is transmitted through the body 12 of a patient to be examined. This radiation reaches a converter 13 for converting the X-ray image to a visible-radiation image 14 which is in turn converted to a videocomposite signal by a scanner-tube video camera 15.

The videocomposite signal on the output $15_1$ of the camera 15 is digitized and entered in a memory (omitted from the drawings).

Computing means (also omitted) serve to carry out a conventional processing operation on two or a number of successive images and the combined image is displayed. By way of example, a frrst image stored in memory corresponds to a patient in whom a contrast product has not yet been injected and the second image corresponds to the same patient after injection of the product. The processing operation consists in performing a subtraction between these two successive images.

Since the signal delivered by the camera 15 is of low strength at low values of luminance, electroluminescent diodes 16 are provided for illuminating the sensitive surface of the camera tube in a manner which will be described hereafter in connection with the diagrams of FIGS. $2_a$ to $2_h$, thereby ensuring that the light energy delivered by said electroluminescent diodes 16 is superimposed on the light energy of the image delivered by the converter 13.

A control and synchronization circuit 17 controls the operation of the generator 10, the electroluminescent diodes 16, the camera 15 and hhe signal-processing means. Said circuit is accordingly provided with outputs designated respectively by the references $17_1$, $17_2$, $17_3$ and $17_4$ and connected to corresponding inputs of the controlled devices.

For the control of the camera 15, the output $17_3$ of the device 17 is connected to the input $15_2$ of the camera 15. A potential which is that of the picture tube grid ($G_1$) is applied to said camera input via a voltage generator 20. By means of said generator, the intensity of the camera readout electron beam is capable of assuming two values in addition to the zero value, namely a first intensity $I_1$ for image readout and a second intensity $I_2$ of substantially lower value than the first outside the periods of image readout. In one example, the intensity $I_1$ is of the order of 2000 nanoamperes and the intensity $I_2$ is of the order of 200 nanoamperes.

The sensitive surface of the camera 15 is considered as composed of an array of elements and each element can be assimilated with the circuit 21 shown in FIG. $1_a$. This circuit 21 includes a current generator 22 for delivering a current whose intensity is a function of the received light energy 23. Said current generator 22 charges a capacitor 24. There are connected in parallel with the capacitor 24 on the one hand a diode 25 and on the other hand a bleeder resistor 26 of very high value. Thus the charge on the capacitor 24 represents the light energy received by the element.

The capacitor 24 discharges during a passage or traversal of the readout electron beam. The discharge current represents the charge of said capacitor and therefore the received light energy. In FIG. $1_a$, the discharge circuit is represented by a switch 27 which is connected to the anode of the diode 25 and is closed when the electron beam reaches the corresponding element, and by a series impedance 28, the value of which varies with the intensity of the electron beam. Said impedance 28 is connected between ground and the switch 27. In addition, the cathode of the diode 25 is connected to a voltage source V.

FIG. $2_a$ represents the frame blanking (or retrace) pulses 30 and FIG. $2_b$ represents the line blanking pulses 31 of the camera 15. By means of the circuit 17, the generator 10 is controlled so as to ensure that the x-radiation 11 is emitted from the start of a frame retrace pulse 30. The control pulse 32 for the generator 10 is shown in FIG. $2_c$. The end of the pulse 32 or in other words the end of emission of x-radiation depends on the x-radiation dose which is necessary in order to obtain a high-quality image. Thus the last instant t of duration of the pulse 32 is independent of the frame frequency.

The diagram of FIG. $2_d$ represents the timedependent variation in intensity of the readout electron beam of the camera 15. This intensity I is zero during line retrace intervals, frame retrace intervals and in the course of the frame or frames during which the sensitive surface of the camera tube receives an image. Thus, in the example shown in FIG. $2_c$, the x-radiation is produced during a frame and during a fraction of the following frame. In this case the intensity of the readout beam is zero over a period of two frames, namely the frames during which the sensitive surface receives an image to be stored.

Prior to formation of the image (that is, prior to the pulse 32), the electron beam has an intensity $I_2$ which falls to zero when the control pulse 32 appears. This intensity assumes a value $I_1$ which is substantially higher than $I_2$ after the frame blanking pulse following the last frame during which the signal 32 has appeared. The beam retains this intensity $I_1$ in the course of one complete frame. Reading of the image formed on the sensitive surface of the camera 15 takes place during this frame. At the start of the next frame 33, the electron beam reverts to the intensity $I_2$.

During the frame 33 which follows readout, the low intensity $I_2$ of the electron beam makes it possible to discharge the capacitors 24 with substantially higher efficiency than would be the case if the beam were maintained at the high level of intensity $I_1$. Thus, in the following image, the sensitive surface of the camera will retain practically no trace of the previous image. In other words, the reduction in intensity of the electron beam permits rapid discharge of the capacitors 24 after reading of one image but prior to formation of the next. This is particularly advantageous in the case of a radiology installation which is intended to form images in rapid succession.

In the embodiments described, the electroluminescent diodes of the device 16 are operated under pulse control.

In a first embodiment (shown in FIG. $2_e$), the light pulses 35 are generated only during the frame retrace intervals. However, these light pulses are not applied during the readout periods (when the intensity of the electron beam is $I_1$).

In another embodiment (shown in FIG. $2_f$), the light pulses 36 are applied during a fraction of each frame. By way of alternative (and as shown in FIG. $2_g$), the light pulses 36' are applied throughout the duration of the frames except during the frame retrace intervals.

In yet another embodiment (shown in FIG. $2_h$), the light pulses 37 are applied only during the line retrace intervals.

In the case of FIG. $2_f$, the duration of the light pulse 36 at each frame is a function of the minimum light energy which has to be applied to the sensitive surface of the camera tube in order to escape from the non-linearity zone of the generator 22. In the case of FIG. $2_h$, the number of light pulses 37 during each frame is a function of the minimum light energy to be applied in order to escape from said non-linearity zone. In the case of FIGS. $2_e$ and $2_g$, this minimum energy can be adjusted solely by the amplitude of the pulses 35 and 36' respectively.

It is worthy of note that the light pulses are applied as soon as the installation is turned-on. Similarly, the electron beam of the camera assumes the value $I_2$ from the instant of turn-on of the installation. In more general terms, the electron beam has the intensity $I_2$ in the standby state. Similarly, light pulses are produced even in this standby state.

What is claimed is:

1. A radiology installation equipped with a video camera, comprising an image-scanner tube for producing an electron beam utilized in producing images in rapid succession, means for varying the intensity of the electron beam of the image scanner tube from a first intensity at the time of readout of one image on a sensitive surface of said tube to a second non-zero intensity of substantially lower value than the first between readout of one image and write-in of the next, wherein said second intensity results in a more rapid discharge of the sensitive surface of said video camera in comparison to if said image-scanner tube utilizes the electron beam having only said first intensity.

2. An installation according to claim 1, wherein a ratio between the two intensities is of the order of ten.

3. An installation according to claim 1, comprising means for generating frame pulse defining frame intervals, wherein the electron beam of the camera scanner tube has the second intensity during all the frame intervals except during an interval or intervals during which readout takes place and the interval or intervals during which the image is formed on the sensitive tube surface.

4. An installation according to claim 1, wherein the means for varying the electron beam intensity comprises:

means for applying a grid voltage to said camera tube; and control circuit means for modifying the grid voltage of the camera tube in order to vary the intensity of the electron beam.

5. An installation according to claim 1, wherein means are provided for applying a minimum light energy to the sensitive surface of the image scanner tube of the camera during a time period prior to and exclusive of image write-in in order to ensure that each element of said surface has a minimum charge at the time of readout by means of the electron beam.

6. An installation according to claim 5, wherein the minimum light energy is applied in the form of pulses.

7. An installation according to claim 6, wherein the pulses are at the frame frequency.

8. An installation according to claim 7, wherein the value of the minimum light energy to be applied is adjusted by means of the light pulse duration at each frame.

9. An installation according to claim 6, wherein the light pulses are at the line frequency at each frame.

10. An installation according to claim 9, wherein the value of the minimum light energy is adjusted by means of the number of light pulses at each frame.

11. An installation according to claim 1, wherein means are provided for combining and subtracting two successive images.

* * * * *